Oct. 4, 1927.

W. F. REACH

GOLF CLUB SHAFT

Filed July 27, 1927

1,644,083

Inventor:
William F. Reach,
by Spear, Middleton, Donaldson & Hall
Attys.

Patented Oct. 4, 1927.

1,644,083

UNITED STATES PATENT OFFICE.

WILLIAM F. REACH, OF SPRINGFIELD, MASSACHUSETTS, ASSIGNOR TO A. G. SPALDING & BROS., OF NEW YORK, N. Y., A CORPORATION OF NEW JERSEY.

GOLF-CLUB SHAFT.

Application filed July 27, 1927. Serial No. 208,822.

My present invention relates to improvements in golf club shafts, such as disclosed in Letters Patent of the United States #1,626,967 granted May 3, 1927, in which a metal shaft is used having a hand grip sleeve of relatively firm material united or connected to the shaft by an interposed member of elastic material having an inherent quality of returning of initial condition after distortion.

My said invention aims to provide a construction which will be economical of manufacture, and assembly, and will be strong and durable and efficient in use.

The invention further aims to provide a construction which enables clubs having varying degrees of torsional resiliency to be assembled from uniform shafts and sleeves.

With these several objects in view the invention includes the novel features of construction, arrangement, and combination of parts hereinafter described.

What I at present regard as the preferred embodiment of the invention is illustrated in the accompanying drawings, in which:—

Figure 1:
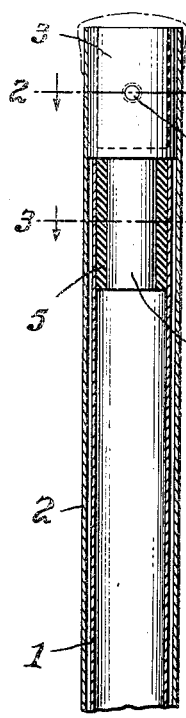
Figure 2:
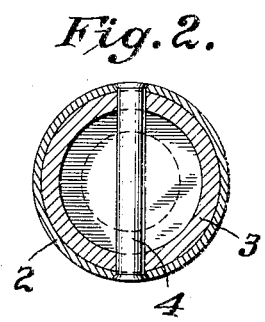
Figure 3:
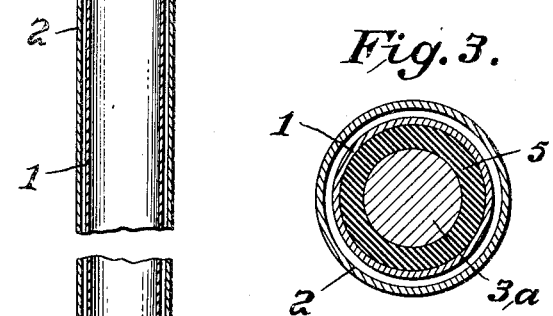
Figure 4:
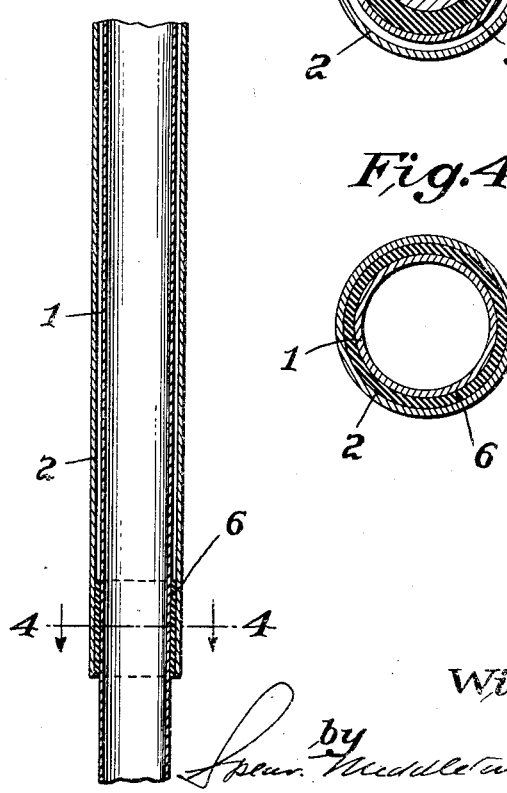

Fig. 1 is a longitudinal sectional view through the hand grasp end of a shaft, and Figs. 2, 3 and 4 are sections on lines 2—2, 3—3 and 4—4 of Fig. 1 respectively.

Figure 5:
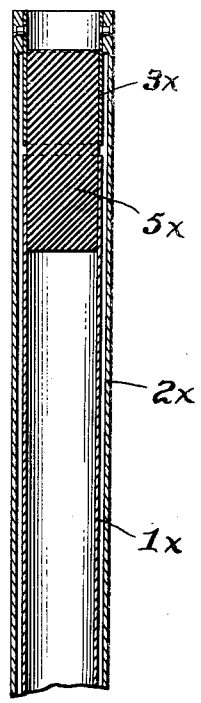

Fig. 5 is a sectional detail showing a modification.

In this drawing, the numeral 1 designates the shaft of tubular steel, representative of the customary type of steel shaft for both wood and iron clubs.

2 designates a hand gasp sleeve encircling the upper end of the club and formed of a comparatively hard or firm material, preferably duralumin, said sleeve having an inside diameter somewhat larger than the external diameter of the shaft. 3 designates a steel plug having a body portion adapted to fit snugly into the end of the sleeve 2 to which it is rigidly secured, after assembly, by means such as transverse pin 4 passing through alining openings in the plug and sleeve.

The plug has a reduced end portion $3^a$ upon which is secured a sleeve or bushing 5 of rubber or other analogous material capable of automatically returning to initial position after distortion. The external diameter of the bushing is such that when the sleeve is forced firmly into the end of the shaft it will fit firmly therein. The ferrule 5 may be secured to both the plug and shaft by cement or analogous means.

Preferably the ferrule is molded or vulcanized on the plug.

6 designates a relatively thin ferrule of rubber or the like used principally as a point of bearing for the forward end of the sleeve 2, which ferrule may also be secured in place by cement or the like. This serves to hold the duralumin sleeve properly spaced concentric to the shaft.

The bushing or sleeve 5 being of relatively soft vulcanized rubber has the capacity for torsional distortion and a permanently inherent quality for returning to initial or normal position and being relatively short and carried by the reduced end of the plug, can be readily forced into position within the end of the shaft.

By providing plugs having reduced portions of different diameters and ferrules of correspondingly different thickness, clubs may be provided having hand grips with varying degrees of torsional resistance without any change in the shafts and sleeves which may be of uniform stock size, or the same results can be secured by providing plugs having reduced portions of different lengths and bushings corresponding thereto.

Instead of having the plug of tubular form it may be made of cylindrical or bushing form as indicated at $3^x$, Fig. 5 having its outer end riveted or otherwise secured to the end of the hand grip sleeve $2^x$ which may have an internal annular flange to fit the exterior of the plug member as shown. In this form the torsion member may be in the shape of a plug $5^x$ having one end secured within the member $3^x$ and its other end secured within the outer end of the shaft designated $1^x$.

Having thus described my invention, what I claim is:

1. A golf club shaft comprising a tubular shaft member, an encircling hand grip sleeve, a plug secured to the end of the sleeve and having a portion within the shaft end spaced from the inner wall thereof, and a member of torsionally distortable material located in the space between the shaft and plug portion therein.

2. The article of claim 1 in which the plug has a cylindrical portion fitting the end of the sleeve and a reduced cylindrical portion carrying the bushing.

3. The article of claim 1 in which the sleeve is of somewhat larger diameter than the shaft and provided with centering means at or adjacent its inner end for holding the shaft concentrically in the sleeve.

4. The article of claim 1 in which the centering means comprises a sleeve of resilient material.

5. A golf club shaft comprising a tubular shaft member, an encircling hand grip sleeve, a plug member secured to the end of the sleeve, and a member of torsionally distortable material connecting said plug member and the end of the shaft.

6. In combination, a tubular metal golf club shaft, a tubular overlying grip member, and a member of torsionally distortable material connecting the upper ends of the shaft and grip members, the main portions of the shaft and grip members being unconnected.

7. In combination, a tubular metal golf club shaft, a tubular overlying grip member, and a member of torsionally distortable material connecting the upper ends of the shaft and grip members, the main portions of the shaft and grip members being unconnected, there being centering means interposed between the shaft and sleeve at the inner end of the latter.

In testimony whereof, I affix my signature.

WILLIAM F. REACH.